US000001231H

United States Statutory Invention Registration [19]

[11] Reg. Number: H1231

Richards

[43] Published: Sep. 7, 1993

[54] ANTISHIP TORPEDO DEFENSE SYSTEM

[75] Inventor: William E. Richards, Silver Springs, Md.

[73] Assignee: The United States of America as represented by the Secretary of the Navy, Washington, D.C.

[21] Appl. No.: 28,639

[22] Filed: Apr. 9, 1979

[51] Int. Cl.[5] ..... G01S 15/66

[52] U.S. Cl. ..... 356/5; 340/850; 356/371; 367/96; 367/128

[58] Field of Search ..... 340/850; 356/5, 371; 367/96

[56] References Cited

U.S. PATENT DOCUMENTS

| | | | |
|---|---|---|---|
| 3,604,803 | 9/1971 | Kahn | 356/5 |
| 3,775,735 | 11/1973 | Funk et al. | 340/850 |
| 3,943,870 | 3/1976 | Paslay | 367/96 |
| 4,105,990 | 8/1978 | Rines et al. | 367/96 |

*Primary Examiner*—Bernarr E. Gregory

*Attorney, Agent, or Firm*—Harvey Fendelman; Thomas Glenn Keough

[57] ABSTRACT

The detection and localization of an antiship torpedo is accomplished by acoustic and optical means. A ship's sonar determines the approximate location of the incoming torpedo and a laser scans this location with energy in the blue-green spectrum. Surface reflections are gated out of a linear detector array and reflected portions of the scanning beam which penetrate the water's surface are divided among the elements of the linear detector array into field of view element signals. These field of view element signals are subsequently compared in time and amplitude to determined disparities between them which point to the torpedo's position, depth and bearing. Optionally, spectral and polarizing filters are provided to enhance the signal to noise ratios and to facilitate signal processing.

8 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.1
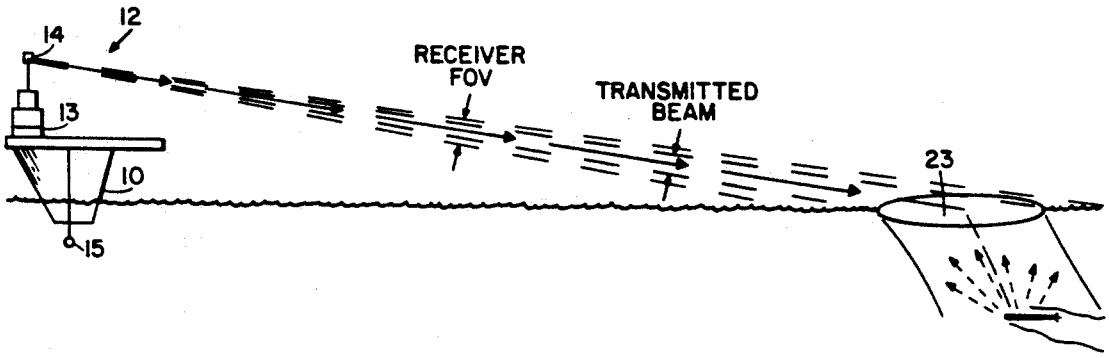
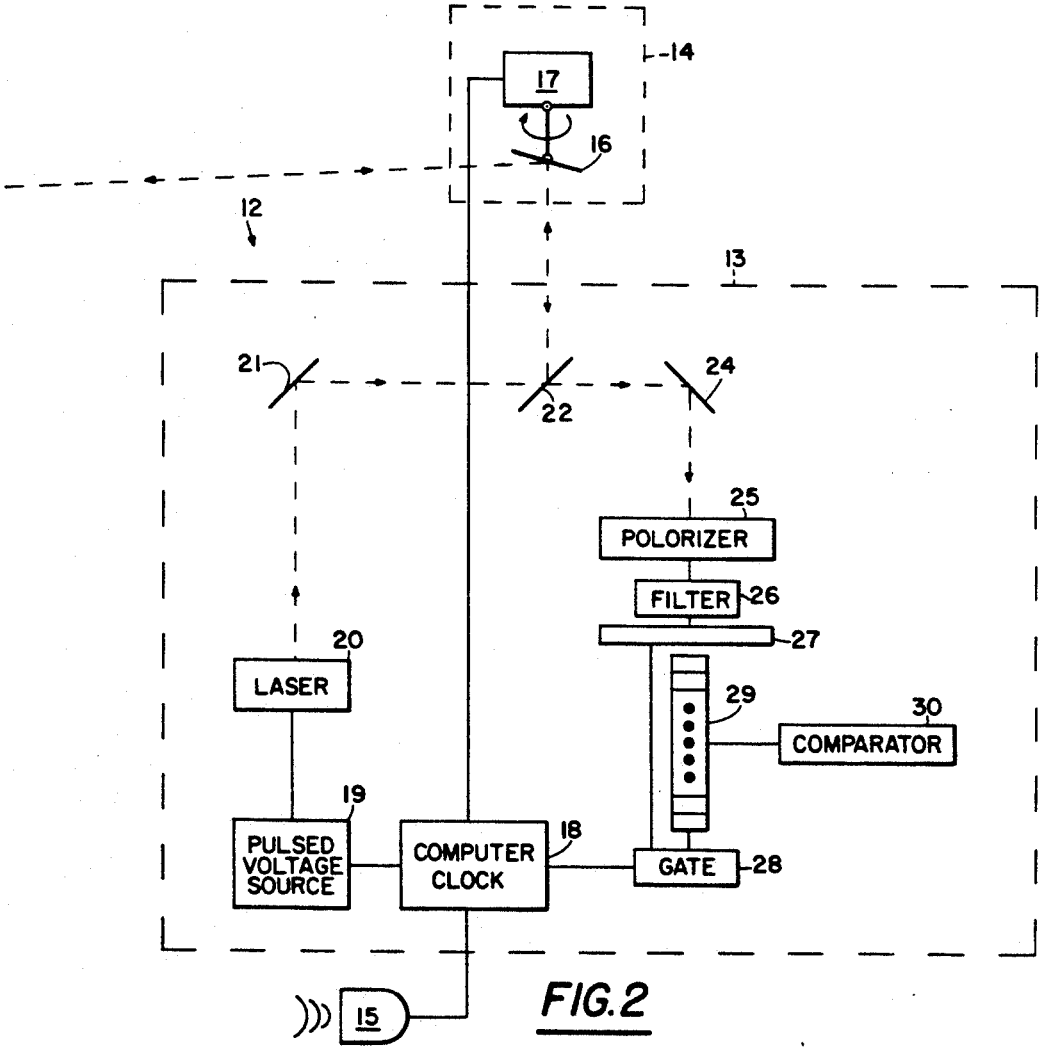
FIG.2

ANTISHIP TORPEDO DEFENSE SYSTEM

BACKGROUND OF THE INVENTION

Antiship torpedoes constitute a danger to the ships of nations depending on imports or relying heavily on foreign commerce. They are the major threat to the noncombatant ships, particularly, where they are unescorted and vast amounts of war materials must be rapidly delivered to stem a confrontation.

Therefore, it becomes imperative that systems be developed for detecting and neutralizing torpedoes.

Straight running torpedoes, as opposed to being homing or guided, typically are dodged by sharply maneuvering a ship out of their paths. Usually, early detection or an awareness that a torpedo has been fired is needed so that random evasive action can be taken. This Russian roulette approach sometimes works, sometimes doesn't.

While studies indicate that a certain percentage of ships escape damage by the maneuvering exercise outlined above, blind turns do not deceive homing or guided torpedoes. Some acoustic homing torpedoes can be jammed by some acoustic noise jammers; yet, these jammers don't affect straight running torpedoes nor the signature homing torpedoes. Particularly with respect to the latter, synthesizing or masking a ship's signature is a complicated, expensive procedure and the results have fallen short of expectations.

Ship-length barriers have been proposed. These envelope a ship in a protective mesh or other suitable barrier like material and are either continuously dragged along in the water or are thrown overboard when there is a threat. Even in the case when the barriers are to be deployed after an antiship torpedo has been detected, the barriers tend to be ponderous and compromised ships' performance by slowing them down and increasing fuel consumption. Furthermore, after a torpedo has been detected, ballistic missiles, high-velocity, flat trajectory missiles, barriers of hovering charges with proximity fuses or hedgehog depth bombs are marginal since contemporary acoustic ranging techniques fail to provide a precise location of an incoming torpedo. Detection and tracking of the oncoming torpedoes by the latest towed tandem arrays leaves much to be desired for reliable interception.

Because of the limitations of the acoustic detectors, optical antiship torpedo detection systems are being investigated. A light detection and ranging (LIDAR) system has been proposed for detecting shallow submerged objects so that a hydrofoil boat, for example, could take evasive action. A paper entitled "Grazing Angle LIDAR for Detection of Shallow Submerged Objects" was presented at the Dec. 11, 1978, meeting of the Optical Society-IEEE Laser Conference in Florida by Richard D. Anderson, Robert F. Howarth, and Gregory C. Mooradian. The LIDAR system disclosed at the conference, while a meritorious advance in the state-of-the-art, did not meet all expectations even though detection of some near surface objects was obtained by reflections of energy in the blue-green spectrum. Precise localization needs to be improved and the depth of detection needs to be increased to detect torpedoes running at depths down to sixty feet. The extraction of the signal from the clutter signal created by surface-return and volume-backscatter-seawater-return also posed problems which limited its effective depth.

Airborne methods of optically detecting submerged objects have been attempted. One is disclosed by Elliot H. Kahn in his U.S. Pat. No. 3,604,803 and is entitled "Optical Detection Method for Submerged Objects". He proposes an aircraft flying above the water and vertically directing a blue-green laser beam and sensing the reflections to detect the submerged object. While this method may meet with a certain degree of success, it cannot be employed in the manner envisioned by the method of this invention which concerns itself with a ship effecting the detection of a torpedo at a relatively small grazing angle with respect to the water's surface and the subsequent neutralization of the torpedo. Backscattering in the present instance is of a magnitude far greater than that tolerated by the Kahn method.

Thus, there is a continuing need in the state-of-the-art for a method and system for assuring the detection and location of an antiship torpedo by the target ship which effectively allows the neutralization of the torpedo.

SUMMARY OF THE INVENTION

The present invention is directed to providing a method for a ship's detecting and localizing of a submerged object. First there is the acoustic determining of the approximate location of the object and a scanning of at least a portion of the object's location with energy in the blue-green spectrum. Next, there is a gating out of those portions of the radiated blue-green energy that are reflected from the water's surface and a subsequent receiving of the portions of the radiated blue-green energy that penetrates the water's surface within the object's location. Next, there is a dividing of the received portions of the radiated blue-green energy that penetrate the water's surface into field of view element signals. Lastly, there is a comparison of the field of view elements in time and amplitude to determine whether the object is within a particular field of view element at a particular depth.

It is a prime object of the instant invention to provide a method for detecting antiship torpedoes.

Still another object is to provide a method of detection which relies upon the acoustic and optical detection capabilities of a ship.

Yet another object is to provide a detection method which not only detects the torpedo but the torpedo's wake to assure its neutralization.

Still another object is to provide a detection method which has a quick reaction time.

Still another object is to provide a detection method relying upon a blue-green spectrum final localization.

Still another object of the invention is to provide a detection method in which the apparatus is fully contained on a ship.

Another object is to provide an electrooptical detection method capable of reliably operating at low grazing angles.

These and other objects of the invention will become more readily apparent from the ensuing specification when takes with the drawings.

BRIEF DESCRIPTION OF THE DRAWINGS

FIG. 1 is an isometric schematical representation of the invention operationally deployed.

FIG. 2 is a block diagramical representation of the invention.

BRIEF DESCRIPTION OF THE PREFERRED EMBODIMENT

Figure 3:
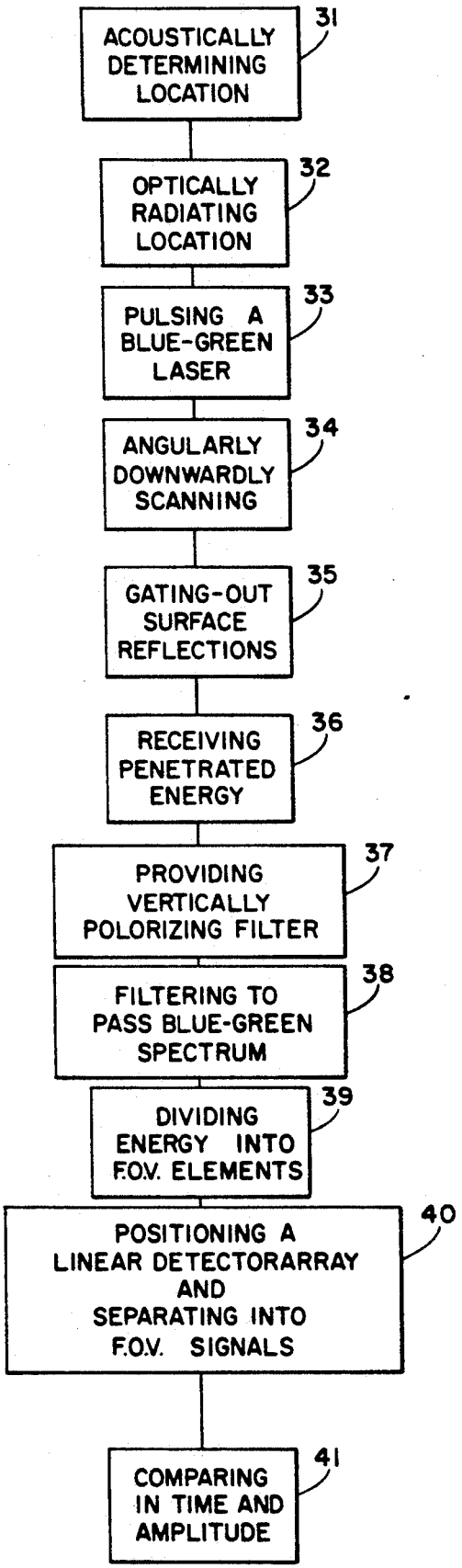
FIG. 3 is a schematic depiction of the method of the claimed invention.

Referring now to FIG. 1 of the drawings, a surface vessel 10 is shown in a head-on bearing and an antiship torpedo 11 is headed toward the vessel. Being a high target value craft, it is provided with an antiship torpedo defense system 12 to help assure its survival. The principal components of the system are an electrooptical section 13, a beamsteering section 14 and an acoustic transducer section 15.

Experience has demonstrated that it is advisable to keep the electrooptical section in a protected location on or below deck in order to safeguard its relatively delicate component parts from vibrations, shocks and temperature changes which might otherwise affect the section's performance. Although the state-of-the-art is rapdily advancing to assure greater reliability where lasers, detectors and their associated equipments are concerned, common sense as well as sound engineering practices dictate it is wiser to prevent unnecessary exposure of the electrooptical section, particularly in the marine environment.

The beamsteering section is mounted in the superstructure about thirty meters above the water's surface and includes a mirror 16 articulated and rotated by a servo drive control 17. The drive control is electronically coupled to the electrooptical section so as to direct radiated beams from the electrooptical section to a designated target area and to receive reflections indicative, for example, of the antiship torpedo 11.

The hull mounted or towed acoustic transducer section 15 first detects and approximately locates an incoming antiship torpedo by either active or passive means. The bearing resolution within a maximum two thousand meter range is about plus and minus five degrees. Since the transducer section is in all likelihood an array, range can be approximated.

Once the approximate location of the torpedo is acoustically located, the electrooptical section 13 proceeds to optically determine the torpedo's exact bearing, range and depth. A computer clock 18 is responsive to signals from the acoustic transducer array to actuate the servo drive control 17 which properly orients mirror 16 so that an optical beam will illuminate the approximate area where the incoming torpedo is. Control signals from the computer clock are fed to a pulsed voltage source 19 which drives a laser 20. The laser emits ten nanosecond pulses of blue-green light at a two hundred pulse per second repetition rate. Each pulse has about fifty millijoules power. The pulsed light beam is reflected from a mirror 21 to a beamsplitter 22 and onto the surface of mirror 16 which directs the beams onto the approximate torpedo area.

The divergence of the pulsed beam of blue-green light is about one milliradian. Thus, the projected beam is circular in cross section but when it impinges on the water's surface it assumes an elliptically-shaped optical footprint 23 covering the approximate area within which the torpedo is traveling. With the pulsed repetition rate and power mentioned above, the torpedo's detection depth is about forty-five meters at a lateral range of about one hundred twenty meters to zero meters at a lateral range of about two-thousand meters.

A torpedo traveling at an anticipated attacking depth, either straight running, acoustic homing or signature homing, will be detectable, within fifteen-hundred meters by the system of this invention. At this range a maximum beam elevation angle $\theta$, sometimes referred to as a grazing angle, is equal to about eighty-eight and one-half degrees, see FIG. 1. In this regard, the wake of the torpedo is more detectable than the torpedo itself. The bubbles created by cavitation are better reflectors than the torpedo body.

Light reflected from the elliptically shaped radiated area is reflected from mirror 15 and back onto beamsplitter 22. The reflected energy impinges on a mirror 24 and through a vertical polarizer 25. The polarizer is oriented to have its axis of polarization oriented in a vertical plane to reduce the transmission of energy attributed to unwanted surface reflections, e.g. sunlight and other sources.

A spectral interference filter 26 has a small bandpass to pass the reflected energy in the blue-green spectrum and thereby eliminate a good deal of the background noise that otherwise might be present.

Because the first energy reflected from the optical footprint area 23 is largely surface reflections of ambient light and the pulsed blue-green energy, an electrooptical shutter 27 blanks or gates this energy out from the optical sensor in the electrooptical section. An electrooptical shutter, for example, of the type disclosed in a U.S. Patent and Trademark Office issued U.S. Pat. No. 4,243,300 and entitled "Large Aperture Phased Element Modulator/Antenna" can be selected. This device could be used to prevent incident energy from being transmitted when a range gating circuit 28 properly actuates the shutter. The command signal for the gating circuitry originates in computer clock 18.

At a time slot determined by the computer clock, the shutter is actuated to pass energy in the blue-green spectrum that has been refracted into the water, reflected from the torpedo or its wake and reflected back to the ship.

A linear detector array 29 is made up of at least fifteen juxtaposed hybrid photo multipliers or silicon diodes, each having a field of view (FOV) of approximately one to three degrees, to receive the incident energy. A lens arrangement is optional to assure a uniform FOV for all elements. The adjacent elements in the detector have overlapping fields of view so that when reflected energy indicative of an approaching torpedo is within the approximate location covered by optical footprint 23, a comparison can be made in a comparator 30 to determine exactly where the torpedo is within the optical footprint. The linear detector array and the comparator are fabricated from components well known to those versed in the electrooptical arts and an explanation of their exact constituency is not felt to be necessary at this time to avoid belaboring the obvious. Bear in mind, however, that it is essential to the successful operation of the method of this apparatus that the field of view element signals originate from the discrete photo multipliers or silicon diodes before a comparison of their relative magnitudes is made in comparator 30. This allows the comparison of optical signal strengths that are indicative of depth (bearing and range are obtained from the servo control 17 driving mirror 16).

Operation of the system progresses as follows. First the transducer array 15 acoustically senses the presence of a torpedo in an approximate location. The computer clock 18, in response to the transducer's sensing of the torpedo, actuates pulsed voltage source 19 which in turn drives laser 20 to emit a series of ten nanosecond pulses of blue-green light at a pulse repetition frequency of about 200 pulses per second. The optical footprint 23 through which the torpedo is passing reflects light energy from ambient sources as well as from the surface of the water back to mirror 16 and into the electrooptic section 13. Since the range has been approximately determined by the transducer, range gating signals from computer clock 18 are fed to an electrooptical shutter 27 via range gate 28 to blind the linear detector array 29 during this time interval. During the time that it takes for the radiated pulse beam to penetrate the water's surface, be refracted downwardly onto the target and reflected back to the ship, electrooptical shutter 27 opens to pass this reflected energy through to linear detector array 29. The FOV of the detector element create discrete signals representative of the reflected energy. These are fed signals to comparator 30 where comparisons of the magnitudes of signals strengths are made. If a target is present, some of the signals coming from certain ones of the elements in the linear detector array have a magnitude greater than others. This indicates the presence of a target within a particular location in the optical footprint. This information can be read out from comparator 30 to associated computer circuitry to arrive at a fire control solution which effects the launching of a guided torpedo or air/water interface interception missile.

By means of range gating the detector and the electrooptical shutter, the depth of the incoming torpedo is determined. By means of gryos within the servo drive control unit 17 bearing is determined. By means of angle depression of mirror 16 the servo drive control 17 provides an indication of range.

Looking now to the method or ship's detecting and localizing an incoming torpedo there is first, an acoustically determining 31 of the location of the incoming torpedo. Next, thre is a radiating 32 by pulsing 33 a blue-green laser and angularly downwardly scanning 34 the incoming torpedo's location. A gating-out 35 of those portions of the radiated blue-green energy that are reflected from the water's surface assures the receiving 36 of portions of the radiated blue-green energy that penetrates the water's surface within the object's location. A providing 37 of vertically polarizing filters helps improve the signal to noise ratio by the elimination of unwanted surface reflections and a filtering 38 further improves the signal to noise ratio by passing only the energy in the blue-green spectrum. A dividing 39 of the received portions of radiated blue-green energy that penetrates the water's surface into field of view element signals is achieved by there being a positioning 40 of a linear detector array to receive the blue-green energy signals and a separating of the signals into discrete field of view element signals. Lastly, there is a comparing 41 of the different field of view of element signals in time and amplitude to determine whether the object is within a particular field of view element at a particular depth and, therefore, to localize the position of the incoming torpedo and enable its neutralization.

Obviously, many other modifications and variations of the present invention are possible in the light of the above teachings. It is therefore to be understood that within the scope of the appended claims the invention may be practiced otherwise than as specifically described.

What is claimed is:

1. A method for a ship's detecting and localizing a submerged object comprising:

acoustically determining the approximate location of the object by projecting acoustic energy from a location in the water and through the water;

pulsing at least a portion of the object's location with energy in the blue-green spectrum from a position out of the water, to the water and into it;

angularly downwardly scanning blue-green energy pulses at a near grazing angle of up to nearly eighty-eight and one-half degrees in the area of the object's location;

gating-out those portions of the pulsed blue-green energy that are reflected from the water's surface;

receiving the portions of the pulsed blue-green energy that penetrate the water's surface within the object's location;

dividing the received portions of pulsed blue-green energy that penetrate the water's surface into field of view element signals; and comparing the field of view element signals in time and amplitude to determine whether the object is within a particular field of view element at a particular depth.

2. A method according to claim 1 further including:

filtering the received portions of the radiated blue-green energy to enable the passage of the blue-green spectrum.

3. A method according to claim 2 in which the step of dividing includes the step of positioning a linear detector array to receive the blue-green energy signals and separating them into discrete field of view element signals.

4. A method according to claim 1 in which the step of dividing includes the step of positioning a linear detector array to receive the blue-green energy signals and separating them into discrete field of view element signals.

5. A method according to claim 4 in which the step of dividing is prior to the step of comparing to obtain relative optical signal strengths among the field of view elements signals so that indication of the object's location can be made.

6. A method according to claim 1 in which the step of dividing is prior to the step of comparing to obtain relative optical signal strengths among the field of view element signals so that indication of the object's location can be made.

7. A method according to claim 1 further including:

providing a vertically polarizing filter to reduce the magnitude of the received portions of radiated blue-green energy.

8. A method for a ship's detecting and localizing a submerged object comprising:

acoustically determining the approximate location of the object;

radiating at least a portion of the object3 s location with energy in the blue-green spectrum, the step of radiating being the pulsing of a laser to radiate blue-green energy pulses toward the object's location and the angularly downwardly scanning of blue-green energy pulses at a near grazing angle in the area of the object's location, the scanning is performed by a rotating mirror gating-out those portions of the radiated blue-green energy that are reflected from the water's surface;

receiving the portions of the radiated blue-green energy that penetrate the water's surface within the object's location;

dividing the received portions of radiated blue-green energy that penetrate the water's surface into field of view element signals; and comparing the field of view element signals in time and amplitude to determine whether the object is within a particular field of view element at a particular depth.

* * * * *